United States Patent
Zhang

(10) Patent No.: US 11,445,085 B2
(45) Date of Patent: Sep. 13, 2022

(54) INFORMATION PROCESSING SYSTEM, DATA TRANSFER METHOD, AND RECORDING MEDIUM

(71) Applicant: Dongzhe Zhang, Kanagawa (JP)

(72) Inventor: Dongzhe Zhang, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/111,936

(22) Filed: Dec. 4, 2020

(65) Prior Publication Data

US 2021/0211554 A1 Jul. 8, 2021

(30) Foreign Application Priority Data

Jan. 7, 2020 (JP) .............................. JP2020-001097

(51) Int. Cl.
| | | |
|---|---|---|
| *H04N 1/00* | (2006.01) | |
| *H04N 1/32* | (2006.01) | |
| *H04L 67/1097* | (2022.01) | |
| *H04N 1/21* | (2006.01) | |

(52) U.S. Cl.
CPC ..... *H04N 1/32523* (2013.01); *H04L 67/1097* (2013.01); *H04N 1/00214* (2013.01); *H04N 1/2183* (2013.01)

(58) Field of Classification Search
CPC .......... H04N 1/32523; H04N 1/00214; H04N 1/2183
USPC ............................................ 358/1.15, 1.16
See application file for complete search history.

(56) References Cited

U.S. PATENT DOCUMENTS

| | | | |
|---|---|---|---|
| 2013/0278968 A1* | 10/2013 | Kusakabe | .......... H04N 1/00225 358/1.16 |
| 2015/0040187 A1 | 2/2015 | Fujii | |
| 2015/0106665 A1 | 4/2015 | Choh et al. | |
| 2016/0259933 A1 | 9/2016 | Sugimura et al. | |
| 2016/0266977 A1 | 9/2016 | Hayashi et al. | |
| 2016/0274945 A1 | 9/2016 | Namihira et al. | |
| 2017/0083697 A1 | 3/2017 | Hayashi et al. | |
| 2017/0109194 A1 | 4/2017 | Namihira et al. | |
| 2017/0255486 A1 | 9/2017 | Zhang et al. | |
| 2017/0255495 A1 | 9/2017 | Sakanashi et al. | |
| 2017/0372414 A1 | 12/2017 | Nishikawa et al. | |
| 2018/0278516 A1* | 9/2018 | Ota | ...................... H04L 45/306 |
| 2019/0289157 A1 | 9/2019 | Zhang et al. | |
| 2019/0303194 A1 | 10/2019 | Namihira et al. | |

FOREIGN PATENT DOCUMENTS

| | | |
|---|---|---|
| JP | 2009-122966 | 6/2009 |
| JP | 2010-177958 | 8/2010 |
| JP | 2012-058935 | 3/2012 |
| JP | 2016-162286 | 9/2016 |

OTHER PUBLICATIONS

Japanese Office Action for 2020-001097 dated Aug. 24, 2021.

* cited by examiner

*Primary Examiner* — Kent Yip
(74) *Attorney, Agent, or Firm* — IPUSA, PLLC

(57) ABSTRACT

An information processing system, a data transfer method, and a recording medium. The information processing system transfers data to storage that is a transfer destination and in response to a data transfer request from a device, the information processing system transfers the data with reference to distribution settings information that designates a storage location of the data in the storage.

10 Claims, 20 Drawing Sheets

FIG. 11

| SENDER NUMBER | DISTRIBUTION DESTINATION FOLDER NAME | NOTIFICATION DESTINATION MAIL ADDRESS |
|---|---|---|
| 0312345678 | ABC | aaa@aaa.com |
| 0311112222 | DEF | bbb@aaa.com |
| 0987654321 | XXX | ccc@aaa.com |
| ⋮ | ⋮ | ⋮ |

501

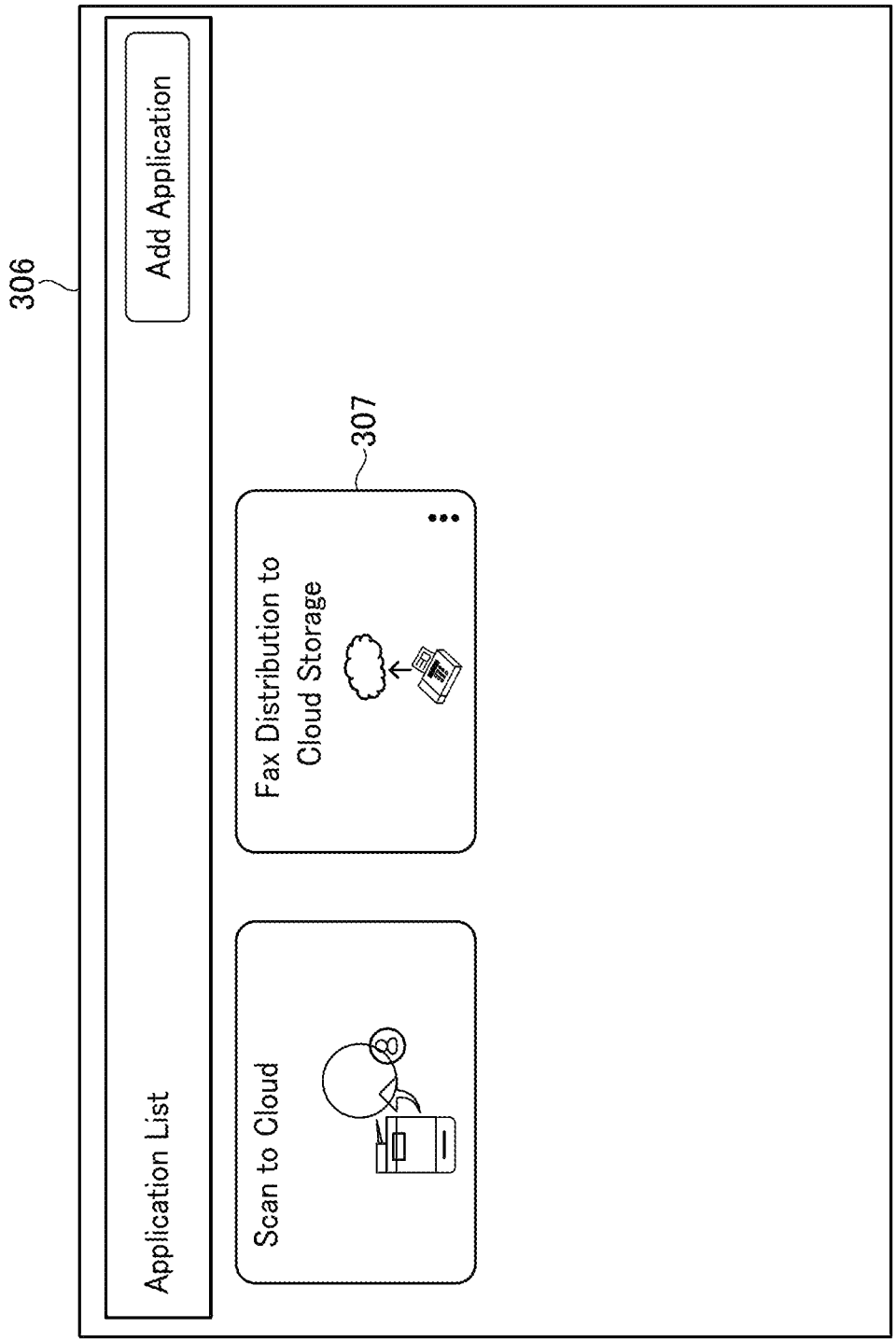

? | * AAA ▼

Back to Top/Back to Application Management

Fax Distribution to Cloud Storage

* indicates required items
Storage Settings

| | | |
|---|---|---|
| Storage | XXX Cloud 309 | |
| Storage Account * | [ Select User ] | User is not selected. |
| | 310 | |
| Data Storage * | [ Select Folder ] | Folder is not selected. |
| Distribution Settings * | [ Select File ] | File is not selected. |

Undefined Data Settings  311  312

Undefined Data Storage Folder Name *  [ Fax Receiving Tray ]

Undefined Data Notification Destination Mail Address (notification not sent when not designated)

[ + ]  314   313

Error Notification Destination Mail Address *

Error notification destination mail address is not designated.

FIG. 17

From: no_reply@xxx.com
To: aaa@aaa.com
Cc:
Title: [Fax Distribution]Fax from 0312345678 (No.1234)

You have received a fax message. Please check from the below link.

ABC_20190213_143342.pdf
https://cloudstrageAAA.com/Documents/top/ABC/ABC_20190213_143342.pdf

From: no_reply@xxx.com
To: aaa@aaa.com
Cc:
Title: 【Fax Distribution】Fax from 0312345678 (No.1234)

You have received a fax message. Please check from the below link.

---

0312345678_20190213_143342.pdf https://cloudstrageAAA.com/Documents/top/undefined/0312345678_20190213_143342.pdf

| FIG. 19 | FIG. 19A |
|---|---|
| | FIG. 19B |

Back to Top/Back to Application Management

▨▦ Fax Distribution to Cloud Storage

\* indicates required items

Storage Settings

Storage  XXX Cloud — 309

Storage Account \*  [Select User] — 310  User is not selected.

Data Storage \*  [Select Folder]  Folder is not selected.

Distribution Settings Table

| · Sender Fax Number | 03-1234-5678 | Distribution Destination Folder Name | Company A | Notification Destination Mail Address | aaa@bbb.com |
| · Sender Fax Number | 03-1111-1111 | Distribution Destination Folder Name | Company B | Notification Destination Mail Address | xxx@bbb.com |

316

308

? ✻ AAA ▸

INFORMATION PROCESSING SYSTEM, DATA TRANSFER METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2020-001097, filed on Jan. 7, 2020, in the Japan Patent Office, the entire disclosure of which is hereby incorporated by reference herein.

BACKGROUND

Technical Field

The present disclosure relates to an information processing system, a data transfer method, and a recording medium.

Background Art

A technique of distributing received data to a predetermined distribution destination has been known. A distribution system including a client terminal that inquires about the optimum person in charge when a file is added to a fax reception folder, and a judgment server that answers the person in charge with the least number of unprocessed cases as the optimum person in charge is disclosed.

According to the conventional art described above, distribution settings cannot be changed easily. Further, since the above-mentioned distribution system distributes according to a processing status of the person in charge, setting the distribution destination is not possible.

SUMMARY

Embodiments of the present disclosure describe an information processing system, a data transfer method, and a recording medium. The information processing system transfers data to storage that is a transfer destination. In response to a data transfer request from a device, the information processing system transfer the data with reference to distribution settings information that designates a storage location of the data in the storage.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 11 is a diagram illustrating an example of distribution settings information;

FIG. 12 is a diagram illustrating an example of a function list screen;

FIG. 13 is a diagram illustrating an example of a data transfer function setting screen according to a first embodiment;

FIG. 17 is a diagram illustrating an example of a notification mail;

FIG. 18 is a diagram illustrating another example of a notification mail; and

FIGS. 19A and 19B are diagrams illustrating an example of a data transfer function setting screen according to a second embodiment.

Figure 1:
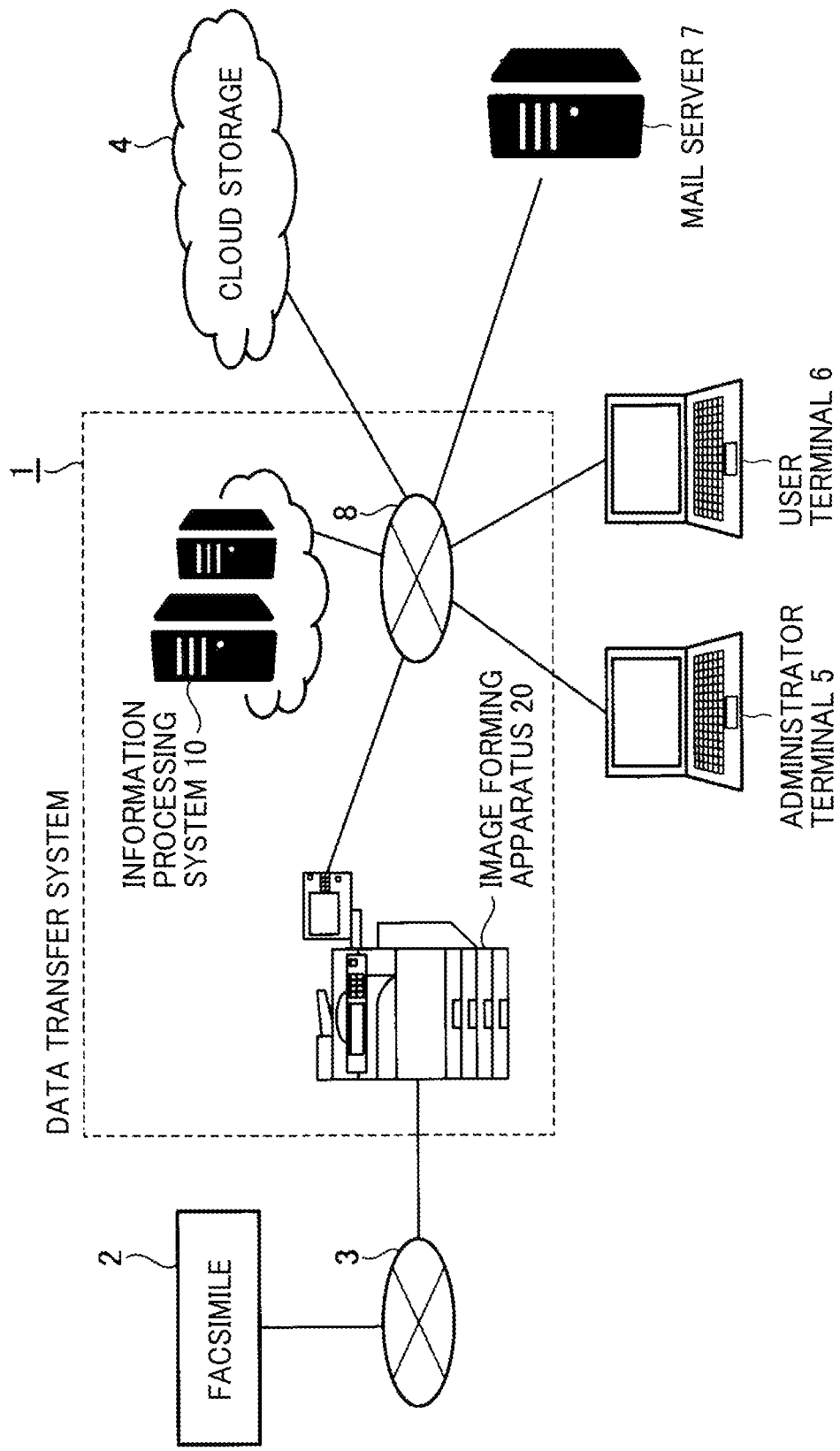
FIG. 1 is a diagram illustrating an example of a system configuration of a data transfer system.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Embodiments of the data transfer system is described below with reference to the drawings.

FIG. 1 is a diagram illustrating an example of a system configuration of a data transfer system.

The data transfer system 1 according to the present embodiment includes an information processing system 10 and an image forming apparatus 20.

The information processing system 10 is communicably connected to each of one or a plurality of image forming apparatuses 20 and devices such as terminals through a network 8. The information processing system 10 includes, for example, basic functions such as user authentication, device authentication, tenant information management, device information management, user information management, screen information management, file management, an external linkage function for linking with external services such as cloud storage, and various functions including an application programming interface (API) for receiving requests from the device and functions as a web service providing system that provides each function to the device such as the image forming apparatus 20 or a terminal.

The information processing system 10 is, for example, a platform for providing cloud services including various functions. Further, the information processing system 10 is implemented by a plurality of information processing apparatuses, and each of the above functions is distributed over the plurality of information processing apparatuses to be operated in cooperation by the plurality of information processing apparatuses. Alternatively, all the functions may be implemented in a single information processing apparatus. Although it is described below that the information processing system 10 executes the processing of each function, the information processing apparatus included in the information processing system 10 actually executes the processing.

Further, the information processing system 10 executes the processing defined in various web application programs (hereinafter referred to as web applications) as the abovementioned cloud service. The web application is an application program that defines the functions provided by the information processing system 10 as a web server to the image forming apparatus 20 which is a web client. Further, the information processing system 10 determines whether or not the web application can be used by each user or device for each web application as needed.

The information processing system 10 also includes as a web application, and a workflow application that executes a workflow that defines a processing flow including units called components. One of the workflow applications is a data transfer application that transfers received data to a designated storage area, such as the data transfer application that transfers facsimile data.

The information processing system 10 executes the process defined in the data transfer application, and transfers the facsimile data received from the image forming apparatus 20 to the cloud storage 4 through the network 8 as described below. The information processing system 10 distributes and stores the facsimile data for each predetermined folder of the cloud storage 4 based on set information. Then, the information processing system 10 transmits a notification mail to the mail address of the notification destination set according to the distribution destination through the mail server 7. The cloud storage 4 is not limited to one, and data may be transferred to a plurality of cloud storages 4. One data transfer application may be able to designate the storage areas (storage destinations) of a plurality of cloud storages 4 as distribution destinations. A different cloud storage 4 may be designated as a distribution destination for each of the plurality of data transfer applications.

The image forming apparatus 20 is an apparatus that implements image forming functions such as scan, print, copy, and fax. The image forming apparatus 20 not only implements the image forming function by itself, but also functions as a web client that uses various functions provided by the information processing system 10. A device for transmitting image data to the information processing system 10 is not limited to the image forming apparatus, and various image data transmission apparatuses may transmit data to the information processing system 10.

Further, the image forming apparatus 20 receives the facsimile data, that is image data from a facsimile 2 through a telephone line network 3. Then, the received facsimile data is printed (image forming), stored in a storage area in the image forming apparatus 20, and transmitted to the information processing system 10 through the network 8. Further, the image forming apparatus 20 includes a transmission application as a device application for transferring image data to the information processing system 10. The device such as the image forming apparatus 20 that receives information not only from the facsimile, and the device may receive image data from various data transmission apparatuses.

The network 8 is an example of a communication network and mainly refers to the interne, but wireless communication or wired communication may be used, and the network 8 is not limited to the internet but may be a local area network (LAN), a wide area network (WAN), a virtual private network (VPN) and the like. The telephone line network 3 is also an example of a communication network and mainly refers to a fax line or the internet but may be another network as well.

Further, the device identification information indicating one or a plurality of image forming apparatuses 20 and the user identification information indicating the user are managed so as to belong to one tenant in the tenant information management function of the information processing system 10. The tenant indicates a group or an organization to which the user belongs, such as a company or an organization, and the tenant identification information that identifies the tenant is stored in association with the user identification information and the device identification information that belong to the tenant in the information processing apparatus of the information processing system 10. Further, the information processing system 10 executes processing in cooperation with a plurality of image forming apparatuses 20 belonging to a plurality of tenants.

The cloud storage 4 is a storage area that is used by an individual on the web. The cloud storage 4 provides a user of an account with a storage area of capacity identified by contract for each account. For example, a tenant administrator of the tenant who is using the cloud service provided by the information processing system 10 may use the storage area of the cloud storage 4 account (tenant account) for which the usage application contract has been made, as a storage area for a link destination (information reference destination/transfer destination) from the information processing system 10.

The facsimile data transferred from the information processing system 10 is stored in the storage area of the account of the cloud storage 4 used by the tenant to which the image forming apparatus 20 of the transmission source of the facsimile data belongs.

The administrator terminal 5 is a terminal used by the tenant administrator. The administrator terminal 5 receives an operation of the tenant administrator and transmits settings information input for each web application to the information processing system 10. For example, the administrator terminal 5 transmits reference destination (storage location) of distribution settings information that describes the method of distributing the facsimile data, which is referenced by the data transfer application, the account information of cloud storage 4 used for reference as the storage area of cloud storage 4, and the like to the information processing system 10 and set in the data transfer application.

The tenant administrator uses the web browser of the administrator terminal 5 to access the web application (data transfer application and application administrator setting web page) of the information processing system 10, a management site of the tenant, the cloud storage 4, and the like and display and input on a web browser. The tenant administrator may use dedicated software other than the web browser. In response to the operation by the tenant administrator, the administrator terminal 5 accesses the tenant management site to make administrator settings such as registering the device to the tenant, granting and canceling device license to the device, and granting or canceling user license to the registered tenant user.

In addition, the administrator terminal 5 receives the operation of the tenant administrator and transmits and stores the distribution settings information (table format file, etc.) indicating the setting contents of the distribution destination of the facsimile data referred to by the data transfer application to the cloud storage 4.

The user terminal 6 is a terminal used by the user of the image forming apparatus 20. The user terminal 6 acquires the facsimile data transferred from the information processing system 10 from the cloud storage 4 for display in response to the user's operation. In addition, the notification mail transmitted from the information processing system 10 is received through the mail server 7. The user uses the web browser of the user terminal 6 to access the web application of the information processing system 10, the cloud storage 4, and the like, and displays and inputs on the web browser. The user may use dedicated software other than the web browser.

The hardware configuration of each device included in the data transfer system 1 according to the present embodiment is described.

Figure 2:
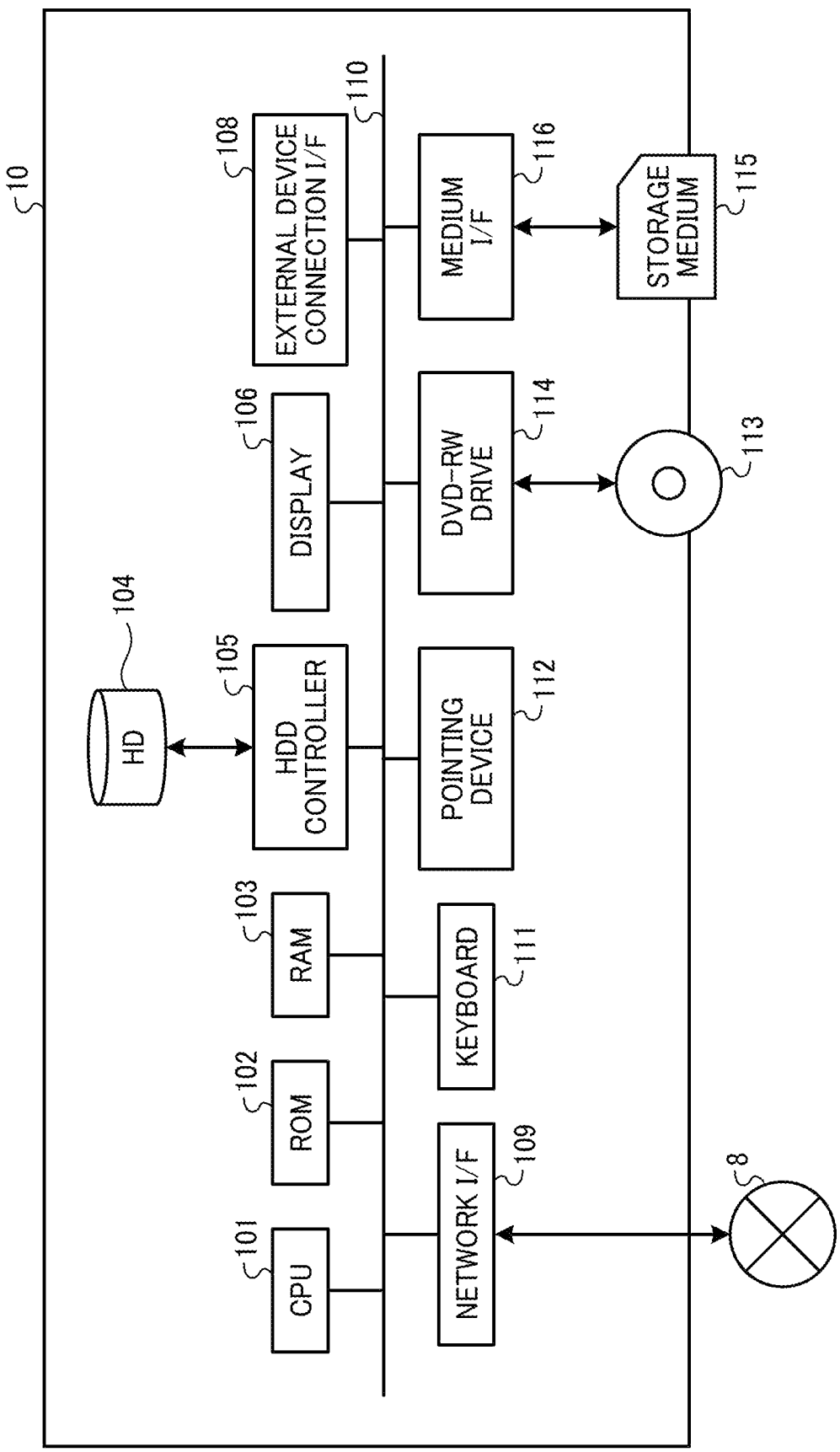
FIG. 2 is a diagram illustrating an example of a hardware configuration of an information processing system.

FIG. 2 is a diagram illustrating an example of a hardware configuration of the information processing system.

The information processing system 10 is implemented by a computer, which is one or more information processing apparatuses, and the information processing apparatus includes a central processing unit (CPU) 101, a read only memory (ROM) 102, a random access memory (RAM) 103, a hard disk (HD) 104, a hard disk drive (HDD) controller 105, a display 106, an external device connection interface (I/F) 108, a network I/F 109, a bus line 110, a keyboard 111, a pointing device 112, a digital versatile disc rewritable (DVD-RW) drive 114 and a medium I/F 116.

Among the above described elements, the CPU 101 controls the overall operation of the information processing apparatus included in the information processing system 10. The ROM 102 stores a program used for driving the CPU 101, such as an initial program loader (IPL). The RAM 103 is used as a work area of the CPU 101. The HD 104 stores programs such as guest network creation application and various other data. The HDD controller 105 controls reading or writing of various data from or to the HD 104 under the control of the CPU 101. The display 106 displays various information such as a cursor, menu, window, characters, or image.

The external device connection I/F 108 is an interface for connecting various external devices. The external device in this case is, for example, a device such as a universal serial bus (USB) memory or a printer. The network I/F 109 is an interface for data communication with the image forming apparatus 20 and the like using the network 8. The bus line 110 is, for example, an address bus or a data bus, which electrically connects the elements such as the CPU 101 illustrated in FIG. 2.

The keyboard 111 is an example of an input device provided with a plurality of keys for allowing a user to input characters, numerals, or various instructions. The pointing device 112 is an example of an input device that allows a user to select or execute a specific instruction, select a target for processing, or move a cursor being displayed. The DVD-RW drive 114 reads and writes various data from and to a DVD-RW 113, which is an example of a removable storage medium. The removable storage medium is not limited to the DVD-RW and may be a digital versatile disc-recordable (DVD-R) or the like. The medium I/F 116 controls reading or writing (storage) of data to the storage medium 115 such as a flash memory.

Figure 3:
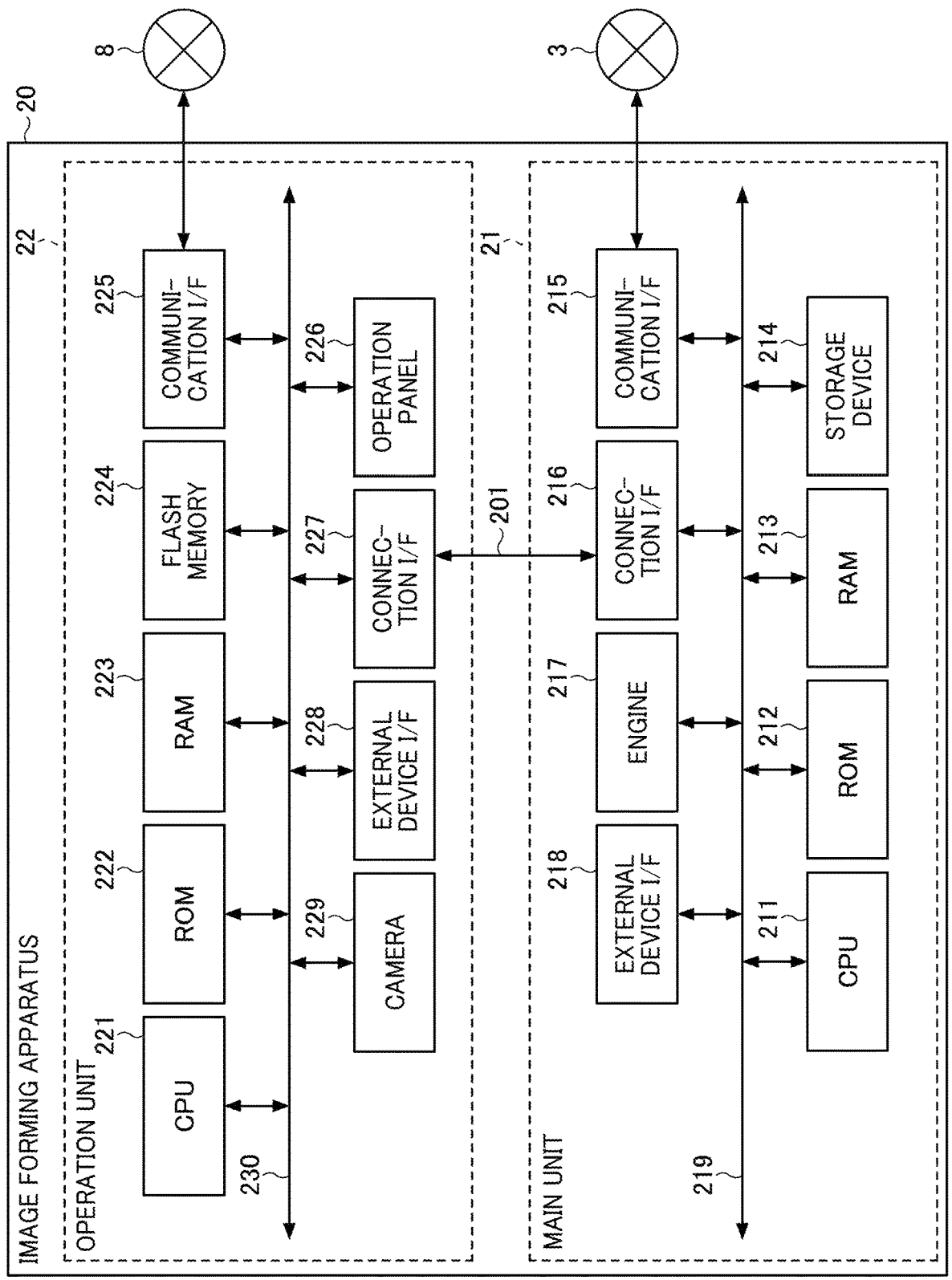
FIG. 3 is a diagram illustrating an example of a hardware configuration of an image forming apparatus.

FIG. 3 is a diagram illustrating an example of a hardware configuration of the image forming apparatus.

The image forming apparatus 20 includes a main unit 21 that implements an image forming function, and an operation unit 22 that receives a user's operation. Reception of the operation by the user includes accepting information (including a signal indicating a coordinate value of a screen or the like) input according to the operation of the user.

The main unit 21 and the operation unit 22 are connected to each other so as to be able to communicate with each other through the communication link 201. The communication link 201 may be in compliance with a universal serial bus (USB) standard, for example. The communication link 201 may be of a standard other than the USB standard regardless of whether the communication link 201 is wired or wireless.

The main unit 21 includes a CPU 211, a ROM 212, a RAM 213, a storage device 214, a communication I/F 215, a connection I/F 216, an engine 217, an external device I/F 218, a system bus 219, and the like.

The CPU 211 is an arithmetic unit that controls the operation of the entire main unit 21 by executing a program stored in the ROM 212 or the storage device 214 or the like with the RAM 213 as a work area. For example, the CPU 211 uses the engine 217 to implement various functions such as copy, scan, fax, and print.

The ROM 212 is, for example, a non-volatile memory that stores a Basic Input/Output System (BIOS) executed when the main unit 21 is started, various settings, and the like. The RAM 213 is a volatile memory used as a work area for the CPU 211. The storage device 214 is, for example, a non-volatile storage device that stores an operating system (OS), an application program, various data, and the like, and is implemented by, for example, a hard disk drive, a solid state drive (SSD), and the like.

The communication I/F 215 is a network interface such as a wireless LAN or a wired LAN for connecting the main unit 21 to the telephone line network 3 and communicating with an external device such as the facsimile 2. The connection I/F 216 is an interface for communicating between the main unit 21 and the operation unit 22 through the communication link 201.

The engine 217 is hardware that performs processing other than general-purpose information processing and communication for implementing the functions such as copy, scan, fax, and print. The engine 217 includes, for example, a scanner (image reading unit) that scans and reads an image of a document, a plotter (image forming unit) that prints on a sheet material such as paper, and a fax unit that performs fax communication. The engine 217 may further include optional equipment such as a finisher that sorts the printed sheets, and an automatic document feeder (ADF) that automatically feeds documents to be scanned.

The external device I/F 218 is an interface for connecting an external device to the main unit 21. The external device may include, for example, an integrated circuit (IC) card reader, a mobile sensor, and the like. The system bus 219 is connected to the above-described components and transmits an address signal, a data signal, various control signals, and the like.

The operation unit 22 includes a CPU 221 and a ROM 222, a RAM 223, a flash memory 224, a communication I/F 225, an operation panel 226, a connection I/F 227, an external device I/F 228, a camera 229, a system bus 230, and the like.

The CPU 221 controls the operation of the entire operation unit 22 by executing a program stored in the ROM 222, the flash memory 224, or the like using the RAM 223 as a work area. The ROM 222 is, for example, a non-volatile memory that stores the BIOS executed when the operation unit 22 is started, various settings, and the like. The RAM 223 is a volatile memory used as a work area for the CPU 221. The flash memory 224 is, for example, a non-volatile storage device that stores an OS, an application program, various data, and the like.

The communication I/F 225 is a network interface for a wireless LAN or a wired LAN for connecting the operation unit 22 to the network 8 and communicating with an external device such as an information processing apparatus.

The operation panel 226 accepts various inputs according to the user's operation and displays various information. The operation panel 226 is implemented by, for example, a liquid crystal display (LCD) equipped with a touch panel function but is not limited to the LCD. The operation panel 226 may be implemented by, for example, an organic electro luminescence (EL) display device equipped with the touch panel function. In alternative to or in addition to the LCD or the EL display, the operation panel 226 may include an operation unit such as hardware keys or a display unit such as an indicator lamp.

The connection I/F 227 is an interface for communicating between the main unit 21 and the operation unit 22 through the communication link 201. The external device I/F 228 is an interface such as the USB for connecting an external device.

The camera 229 is a photographing device that captures an image of the user. The camera 229 may be installed outside the image forming apparatus 20 and connected to the operation unit 22 through an external device I/F 228. The system bus 230 is connected to the above-described components and transmits an address signal, a data signal, various control signals, and the like.

A functional configuration of each device included in the data transfer system 1 according to the present embodiment is described below.

Figure 4:
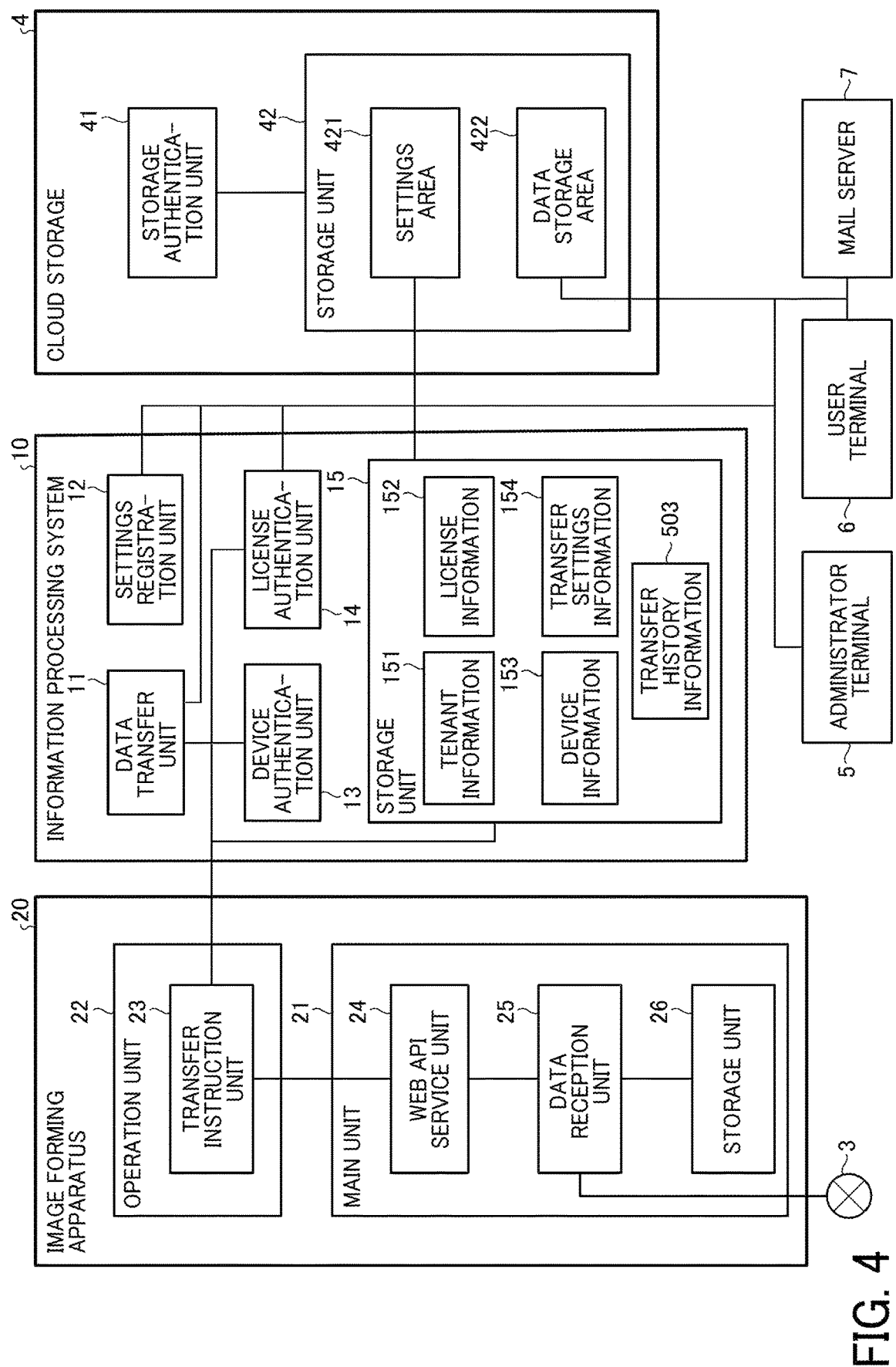
FIG. 4 is a diagram illustrating an example of functional configuration of the information processing system and the image forming apparatus.

FIG. 4 is a diagram illustrating an example of functions of the information processing system and the image forming apparatus.

The information processing system 10 includes a data transfer unit 11, a settings registration unit 12, a device authentication unit 13, a license authentication unit 14, and a storage unit 15. Each unit is included in one or more information processing apparatuses implementing the information processing system 10. The functions may be distributed and implemented, for example, an information processing apparatus A including basic functions such as a device authentication unit 13 and a license authentication unit 14, information processing apparatus B including a web application such as a data transfer unit 11 or a settings registration unit 12, and information processing apparatus C including a database for storing various information such as a storage unit 15. In addition, other distribution methods may be used, and all the functions may be implemented in one information processing apparatus.

The data transfer unit 11 transfers the facsimile data. Specifically, the data transfer unit 11 executes a process defined in a data transfer application (facsimile transfer application or the like). The data transfer unit 11 acquires the distribution settings information stored in the settings area 421 of the storage unit 42 of the cloud storage 4, distributes the received facsimile data for each folder based on the acquired distribution settings information, and transmits the data to the data storage area 422 of the storage unit 42 of the cloud storage 4.

The settings registration unit 12 registers transfer settings information 154 indicating the settings used for the process executed by the data transfer unit 11. Specifically, the settings registration unit 12 transmits setting screen data to the administrator terminal 5 and receives the transfer settings information 154 from the administrator terminal 5. Then, the settings registration unit 12 stores the received transfer settings information 154 in the storage unit 15. The settings registration unit 12 is implemented as an administrator setting web page for setting the data transfer application for the tenant administrator.

The device authentication unit 13 authenticates the image forming apparatus 20. Specifically, in response to receiving the device authentication request from the image forming apparatus 20, the device authentication unit 13 determines whether or not the device identification number included in the request is included in the device information 153. When the device authentication unit 13 determines that the device identification number is included in the device information 153, the device authentication unit 13 issues a device authentication ticket indicating that the device authentication is successful. The device identification number is a number for identifying the image forming apparatus 20.

The license authentication unit 14 determines whether or not the tenant has a license to use the web application based on the license information 152 described below. The license authentication unit 14 permits the use of the web application when the license authentication unit 14 determines that the tenant holds the license.

The storage unit 15 stores various information necessary for executing the process defined in the web application. For example, the storage unit 15 stores tenant information 151, license information 152, device information 153, transfer settings information 154, and transfer history information 503.

The tenant information 151 is information indicating the attributes of the tenant. For example, the tenant information 151 includes a tenant identifier (ID) that identifies the tenant, a tenant name, and the like as items.

The license information 152 indicates a license set for each tenant based on a contract between the organization that opened the tenant and the management company of the information processing system 10 (cloud service). Specifically, the license information 152 indicates the number of licenses for using the web application for each tenant. The types of licenses include user license, device license, and the like. For example, one image forming apparatus 20 is assigned to one device license in the tenant.

The device information 153 indicates the attributes of the device. In the present embodiment, the device indicates the image forming apparatus 20. Specifically, the device information 153 includes a device identification number or the like that identifies the device. The device information 153 is registered in association with the tenant information 151.

The transfer settings information 154 is referred to by the data transfer unit 11. The transfer settings information 154 is input by the tenant administrator on the data transfer function setting screen displayed on the administrator terminal 5. The details of the data transfer function setting screen is described below. The transfer history information 503 is also described below.

The image forming apparatus 20 includes the main unit 21 and the operation unit 22.

The main unit 21 implements an image forming function that is an internal function of the image forming apparatus 20, such as copy, scan, and print. The main unit 21 includes a web API service unit 24, a data reception unit 25, and a storage unit 26.

The web API service unit 24 provides the web API to the operation unit 22. The web API is an interface for using various functions of the main unit 21. The web API includes an API for acquiring the device identification number. The web API service unit 24 transmits the device identification number stored in the main unit 21 to the operation unit 22 in response to the API call from the operation unit 22.

The data reception unit 25 receives the facsimile data from the facsimile 2 through the telephone line network 3. The data reception unit 25 stores the received facsimile data in the storage unit 26.

The storage unit 26 stores the facsimile data. In addition, the storage unit 26 stores the device identification number of the image forming apparatus 20.

The operation unit 22 receives an operation from the user and instructs the main unit 21 to execute various processes. The operation unit 22 includes an interface for selecting an application program to be started. The operation unit 22 includes a transfer instruction unit 23.

The transfer instruction unit 23 transfers the facsimile data stored in the storage unit 26 to the information processing system 10. Specifically, when the data reception unit 25 receives the facsimile data, the transfer instruction unit 23 registers a data transfer process in a queue stored in the RAM 223. The queue is information indicating order of processing to be executed by the transfer instruction unit 23. The transfer instruction unit 23 executes the data transfer process for the information processing apparatus including the data transfer unit 11 of the information processing system 10 one by one in the order registered in the queue.

The transfer instruction unit 23 is implemented by the data transfer application installed in the operation unit 22 of the image forming apparatus 20. The tenant administrator downloads the data transfer application from an external application market server or the like to the operation unit 22 of the image forming apparatus 20 and install the data transfer application.

The cloud storage 4 includes a storage authentication unit 41 and a storage unit 42.

The storage authentication unit 41 determines whether or not the cloud storage 4 can be used for each account.

The storage unit 42 is a storage area set for each account. The storage unit 42 includes a settings area 421 and a data storage area 422.

The settings area 421 is an area in which distribution settings information is stored. The distribution settings information is transmitted from the administrator terminal 5 by the operation of the tenant administrator.

The data storage area 422 is an area in which the facsimile data transferred from the information processing apparatus including the data transfer unit 11 of the information processing system 10 is stored. The data storage area 422 includes a plurality of folders. In the above-described distribution settings information, which folder to distribute the received data is set for each transmission source.

The operation of the data transfer system 1 is described with reference to the drawings.

Figure 5:
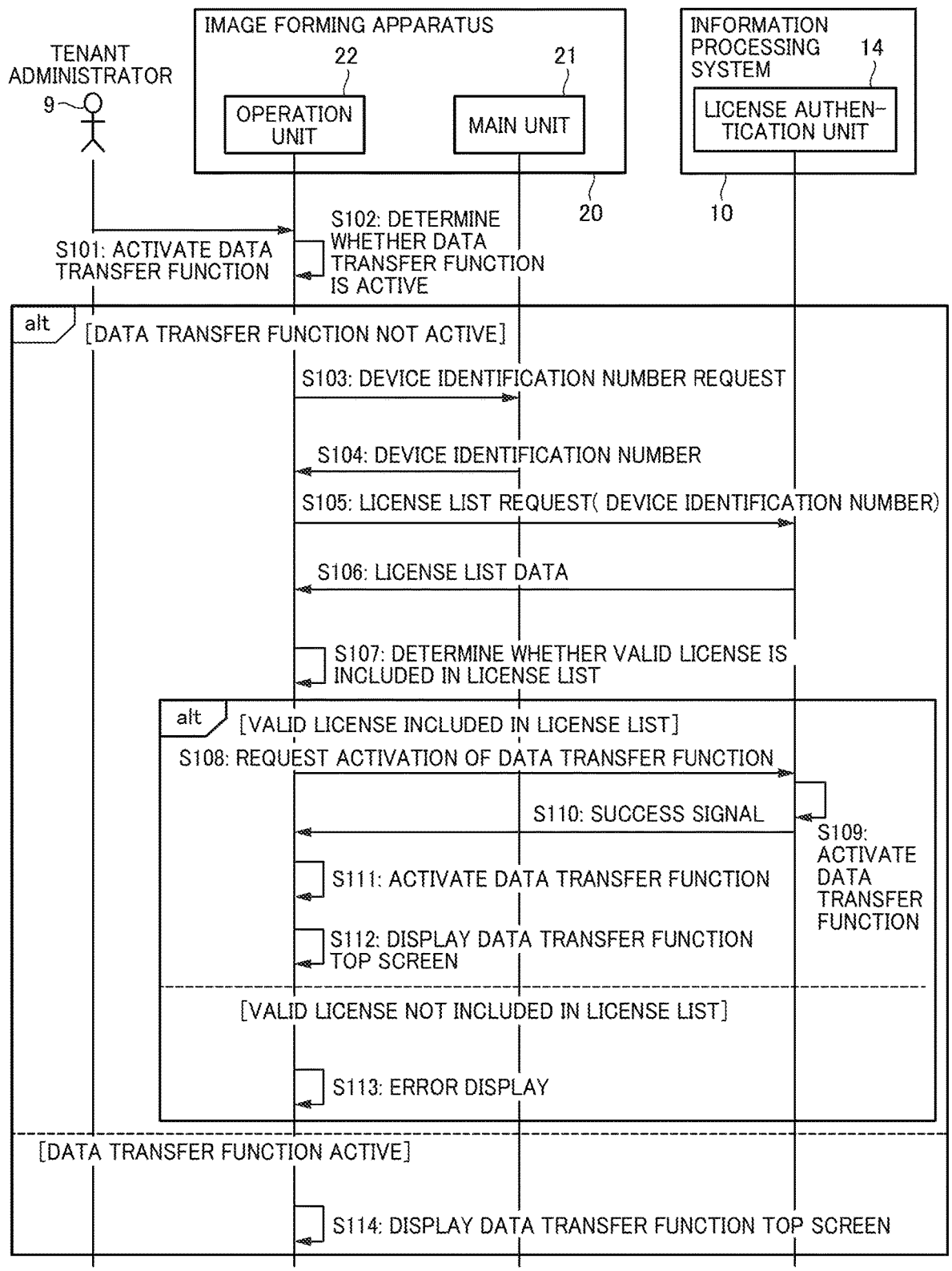
FIG. 5 is a sequence diagram illustrating an example of a data transfer function activation process.

FIG. 5 is a sequence diagram illustrating an example of a data transfer function activation process.

In order to use the processing of the data transfer unit 11 of the information processing system 10, the tenant administrator 9 activates the data transfer function on the screen for operating the operation unit 22 of the image forming apparatus 20 in step S101.

Figure 6:
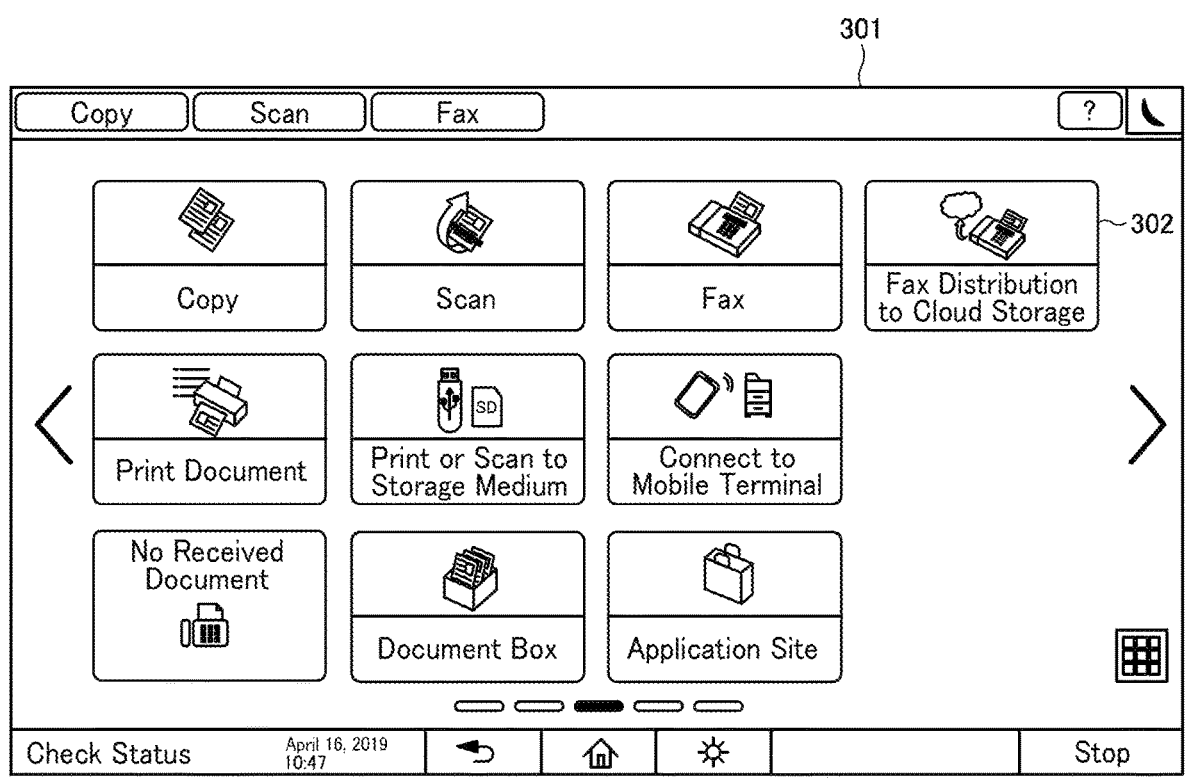
FIG. 6 is a diagram illustrating an example of an operation unit function list screen.

FIG. 6 is a diagram illustrating an example of an operation unit function list screen.

The operation unit function list screen 301 includes a list of buttons for selecting a function. The list of buttons for selecting the function includes the data transfer function selection button 302. The data transfer function selection button 302 is an icon image of the transfer application installed in the image forming apparatus 20. The tenant administrator 9 activates the data transfer function by pressing the data transfer function selection button 302.

Figure 7:
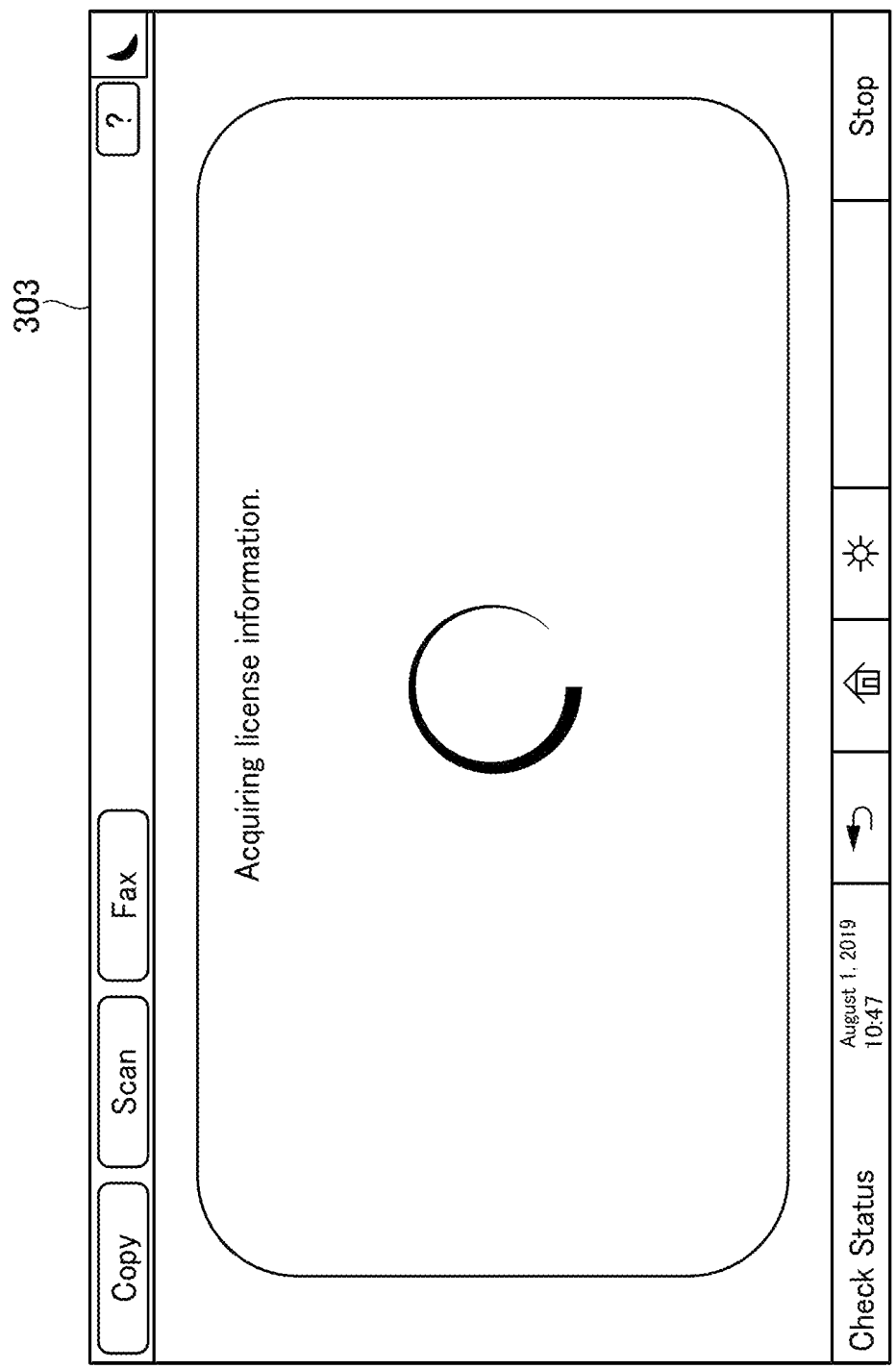
FIG. 7 is a diagram illustrating an example of a screen in the data transfer function activation process.

FIG. 7 is a diagram illustrating an example of a screen in the data transfer function activation process.

When the data transfer function is activated, the operation unit 22 displays an authentication screen. The operation unit 22 receives user identification information such as a mail address and a password through the authentication screen. The user identification information is transmitted to the information processing system 10, and when the authentication function of the information processing system 10 authenticates that the user identification information indicates the tenant administrator, the operation unit 22 displays the processing screen 303.

Returning to FIG. 5, the transfer instruction unit 23 of the operation unit 22 determines whether or not the data transfer function is active in step S102. Specifically, the transfer instruction unit 23 determines that the data transfer function is active when the transfer instruction unit 23 stores flag information indicating whether the data transfer function is active or not.

When the transfer instruction unit 23 determines that the data transfer function is not active, the transfer instruction unit 23 transmits a device identification number request to the main unit 21 in step S103. The web API service unit 24 of the main unit 21 reads data indicating the device identification number from the storage unit 26. In step S104, the web API service unit 24 transmits data indicating the device identification number to the operation unit 22.

In step S105, the transfer instruction unit 23 of the operation unit 22 transmits a request for a list of licenses to the information processing apparatus of the information processing system 10. The request for the list of licenses includes the device identification number. When the tenant administrator is successfully authenticated by the user identification information and the device identification number does not correspond to the tenant (if the device is not registered in the tenant), the device identification number for the tenant is automatically registered.

In step S106, the license authentication unit 14 of the information processing system 10 refers to the license information 152 and transmits data indicating the list of licenses. Specifically, the license authentication unit 14 identifies the tenant from the tenant information 151 associated with the transmitted device identification number. Then, the license authentication unit 14 acquires list data indicating a list of web applications (web services) contracted by the identified tenant and a list of licenses for each web application (web service) obtained from the license information 152 and transmits the lists to the image forming apparatus 20.

In step S107, the transfer instruction unit 23 of the operation unit 22 determines whether or not the web application of the information processing system 10 that the transfer application of the image forming apparatus 20 that is the transfer instruction unit 23 uses as the transfer destination exists and whether or not a valid license is included in the list of contracted web applications and licenses. Specifically, the transfer instruction unit 23 (data transfer application) searches for the web application corresponding to the application type designated by the data transfer application from the list of contracted web applications. Further, the transfer instruction unit 23 determines that the list of licenses includes valid licenses when the number of licenses to which device such as the image forming apparatus 20 is not assigned is 1 or more, out of the licenses contracted by the tenant in the list of web application licenses corresponding to the data transfer application.

Whether the license is within a validity period may be determined in step S106 or step S107, when the validity period is set for each license. Further, the license authentication unit 14 may transmit a signal indicating an error in step S106 when the information processing system 10 does not have a web application corresponding to the data transfer application of the image forming apparatus 20.

When the transfer instruction unit 23 determines that the license list includes valid license, the transfer instruction unit 23 transmits an activation request of the data transfer function to the information processing system 10 in step S108. The activation request of the data transfer function includes the device identification number.

In step S109, the license authentication unit 14 activates the data transfer function. Specifically, the license authentication unit 14 selects one license to which no device is assigned from the licenses of the tenant and registers the license in association with the received device identification number. As a result, the number of unassigned licenses is reduced by one.

In step S110, the license authentication unit 14 transmits a success signal to the image forming apparatus 20. In step S111, the transfer instruction unit 23 of the operation unit 22 activates the data transfer function. Specifically, the transfer instruction unit 23 stores the value of the flag information indicating whether the data transfer function is active or not active as "active".

As a result, when the tenant administrator receives an operation to activate the data transfer function from the next time onward, the transfer instruction unit 23 determines that the data transfer function is active in the process of step S102.

In step S112, the transfer instruction unit 23 displays the top screen of the data transfer function.

When the transfer instruction unit 23 determines in the process of step S107 that the valid license is not included in the license list, the transfer instruction unit 23 displays an error in step S113. Specifically, the transfer instruction unit 23 displays an error screen.

Figure 8:
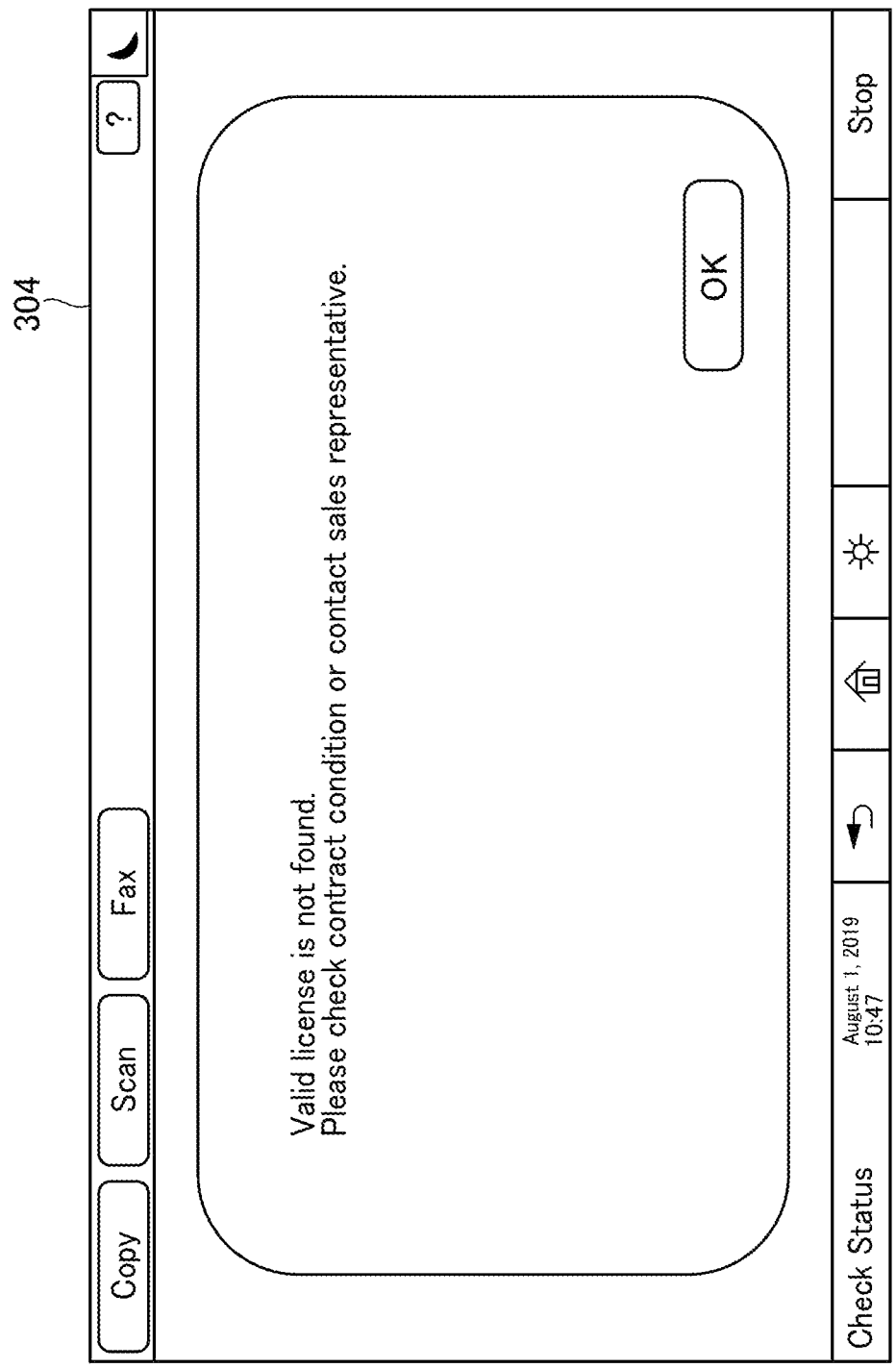
FIG. 8 is a diagram illustrating an example of an error screen in the data transfer function activation process.

FIG. 8 is a diagram illustrating an example of the error screen in the data transfer function activation process.

On the error screen 304, a message indicating that the valid license is not found is displayed.

Returning to FIG. 5, when the transfer instruction unit 23 determines that the data transfer function is active in step S102, the transfer instruction unit 23 displays the top screen of the data transfer function in step S114.

Figure 9:
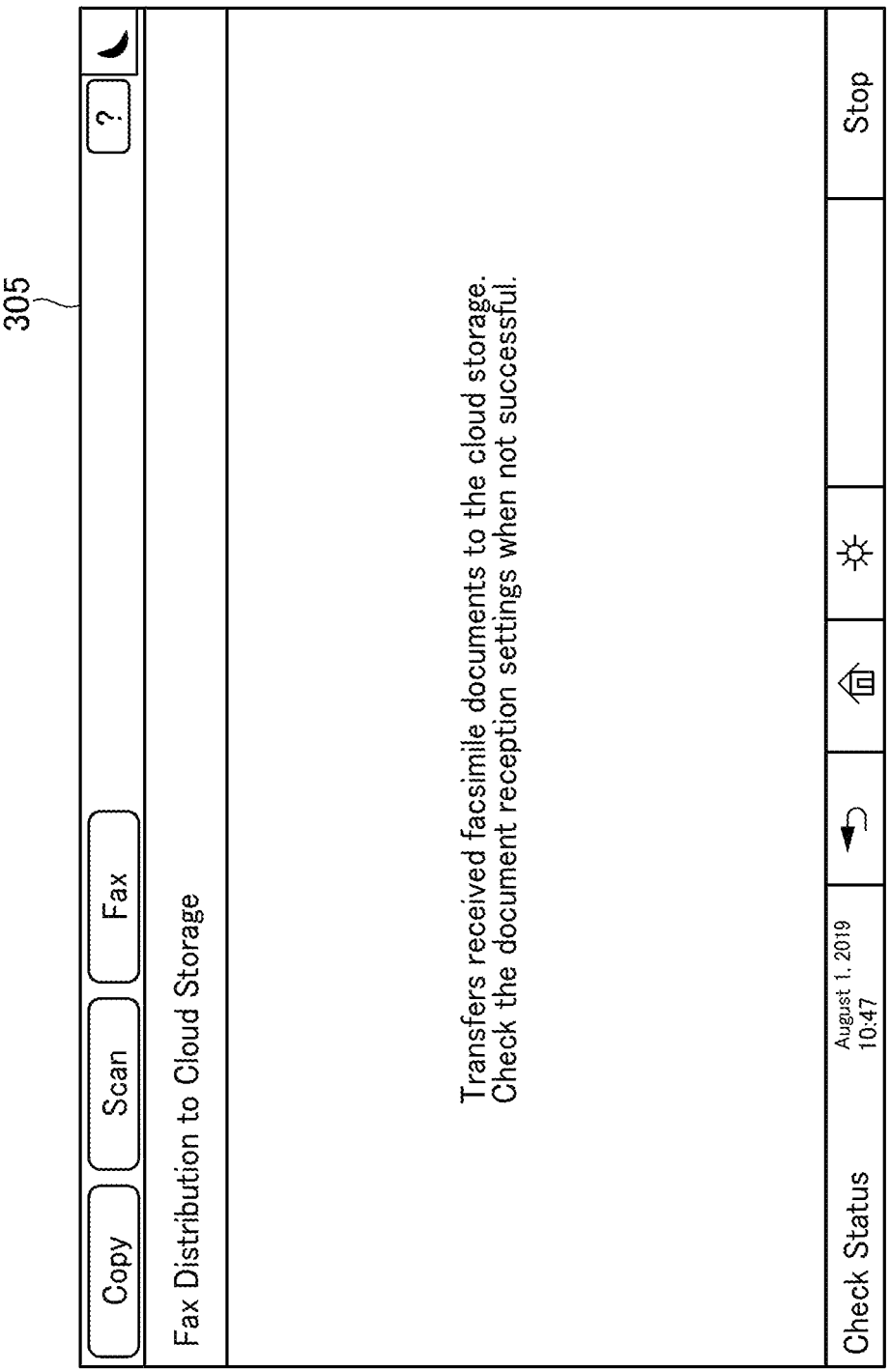
FIG. 9 is a diagram illustrating an example of a top screen of a data transfer function.

FIG. 9 is a diagram illustrating an example of the top screen of the data transfer function.

On the top screen 305, a message indicating the content of the data transfer function is displayed. The top screen 305 is displayed when it is determined that the data transfer function is active, and when the icon is pressed while the transfer application is operating after the data transfer function is activated. Since the data transfer in the data transfer function is triggered by the reception of facsimile data, the top screen 305 does not include a display prompting the operation for transfer. The top screen 305 may include a display that accepts operations such as execution of batch transfer of stored untransmitted facsimile data and settings for transfer (time of batch transfer, specification of file format at the time of transfer, etc.).

The operation of setting the data transfer function by the tenant administrator is described with reference to the drawings.

Figure 10:
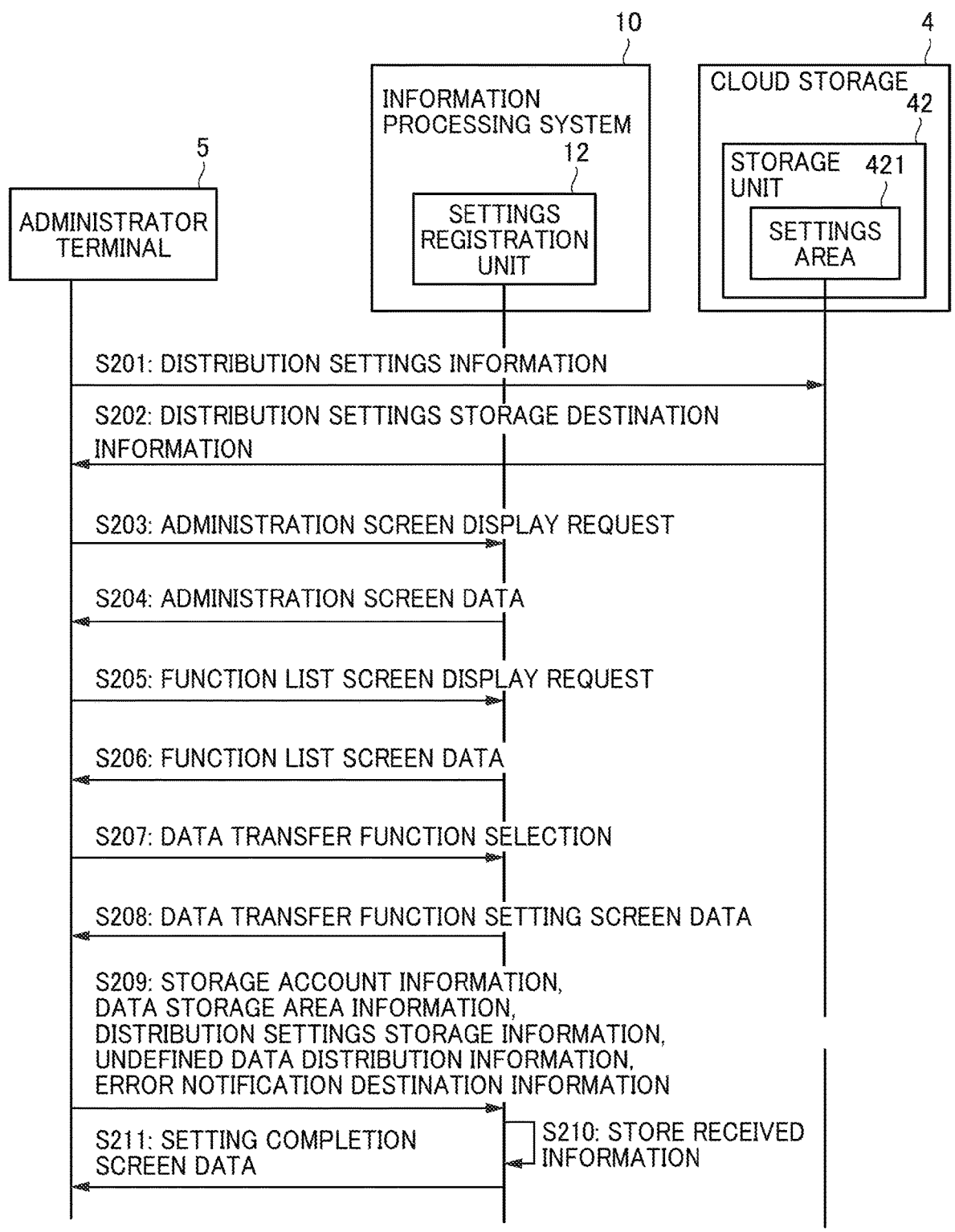
FIG. 10 is a sequence diagram illustrating an example of a data transfer function setting process.

FIG. 10 is a sequence diagram illustrating an example of a data transfer function setting process.

In response to the operation of the tenant administrator, the administrator terminal 5 generates and transmits the distribution settings information to the cloud storage 4 in step S201. The distribution settings information is a file containing tabular data such as an Excel file. On the operation screen for operating the cloud storage 4 displayed on the web browser of the administrator terminal 5, the administrator terminal 5 transmits the file to the cloud storage 4 by the operation of storing the file in the desired folder of the tenant administrator.

FIG. 11 is a diagram illustrating an example of the distribution settings information.

The distribution settings information 501 includes, as items, a "sender number", a "distribution destination folder name", and a "notification destination mail address".

The "sender number" indicates fax number of the sender of the facsimile data received by the image forming apparatus 20.

The "distribution destination folder name" indicates the folder name of the storage location of the facsimile data in the distribution destination. For the folder name, a company name, an organization name, or the like corresponding to the facsimile number of the sender of the facsimile data can be set.

The "notification destination mail address" indicates the mail address of the destination of the notification mail. The mail address is an address that can be viewed on terminals such as the user terminal 6 and the administrator terminal 5.

Returning to FIG. 10, when the distribution settings information is received from the administrator terminal 5, the cloud storage 4 stores the received distribution settings information in the settings area 421 of the storage unit 42. The settings area 421 is a folder for storing the distribution settings information selected on the web browser of the administrator terminal 5. When the storage destination folder is selected by the web browser of the administrator terminal 5, the information indicating the storage destination of the distribution settings information is displayed in a uniform resource locator (URL) display field of the web browser. The information (URL) indicating the storage destination of the distribution settings information is transmitted to the administrator terminal 5 in step S202.

In step S203, the administrator terminal 5 receives an operation of the tenant administrator and transmits a display request of the management screen to the information processing system 10. In step S204, the settings registration unit 12 of the information processing system 10 transmits data indicating the management screen of the web application (data transfer application) to the administrator terminal 5.

The administrator terminal 5 displays the management screen. In step S205, the administrator terminal 5 receives an operation of the tenant administrator and transmits a display request of the function list screen. The function list screen is a screen indicating a list of target functions managed by the tenant to which the tenant administrator belongs.

In step S206, the settings registration unit 12 of the information processing system 10 transmits data indicating the function list screen to the administrator terminal 5. The administrator terminal 5 displays the function list screen.

FIG. 12 is a diagram illustrating an example of the function list screen.

The function list screen 306 includes a list of buttons for selecting a target function managed by the tenant to which the tenant administrator belongs. The list of buttons includes a data transfer function selection button 307. The target function managed by the tenant is a contracted web application (web service), and the management screen of the contracted web application can be opened by the web browser of the administrator terminal 5.

Returning to FIG. 10, when the data transfer function selection button 307 is pressed, the administrator terminal 5 transmits the data transfer function selection signal to the information processing system 10 in step S207. In step S208, the settings registration unit 12 of the information processing system 10 transmits data indicating the data transfer function setting screen to the administrator terminal 5. The administrator terminal 5 displays the data transfer function setting screen.

FIG. 13 is a diagram illustrating an example of the data transfer function setting screen according to a first embodiment.

The data transfer function setting screen 308 includes a storage account selection button 309, a data storage folder selection button 310, a distribution settings storage destination selection button 311, an undefined data storage folder name input field 312, undefined data notification destination mail address input field 313, and an error notification destination mail address input field 314.

The storage account selection button 309 is a graphical user interface (GUI) for selecting an account of the cloud storage 4 registered in advance by the tenant administrator. In the data transfer process described below, the facsimile data is distributed and transferred to the storage area set for the account selected here. The GUI is a button, an input item, or the like on the web page of the setting screen to be displayed on the web browser of the administrator terminal 5, but the GUI may be implemented by a dedicated application as well as the web browser.

The data storage folder selection button 310 is a GUI for selecting a folder to which the facsimile data is transferred in the storage area set for the account selected by the storage account selection button 309. In the data transfer process described below, the facsimile data is further distributed and transferred to the folder indicated by the "distribution destination folder name" of the distribution settings information in the folder selected here.

The distribution settings storage destination selection button 311 is a GUI for selecting a location in which the distribution settings information is stored in the cloud storage 4. The location where the distribution settings information is stored is indicated by, for example, a combination of a path name and a file name.

The undefined data storage folder name input field 312 is a GUI for inputting the folder name of the distribution destination of the facsimile data transmitted from the sender number not defined in the distribution settings information.

The undefined data notification destination mail address input field 313 is a GUI for inputting a mail address of the destination of the notification mail when the facsimile data is transmitted from the sender number not defined in the distribution settings information.

The error notification destination mail address input field 314 is a GUI for inputting the mail address of the destination of the notification mail when an error occurs in the data transfer function.

Returning to FIG. 10, the administrator terminal 5 transmits the storage account information, the data storage area information, the distribution settings storage destination information, the undefined data distribution information, the error notification destination information, input by the tenant administrator to the information processing system 10.

The storage account information indicates an account selected by pressing the storage account selection button 309. The storage account information includes, for example, an ID that identifies the account and a password for authentication.

The data storage area information indicates a storage area selected by pressing the data storage folder selection button 310.

The distribution settings storage destination information indicates a location selected by pressing the distribution settings storage destination selection button 311.

The undefined data distribution information indicates the folder name input in the undefined data storage folder name input field 312 and the mail address input in the undefined data notification destination mail address input field 313.

The error notification destination information indicates the mail address entered in the error notification destination mail address input field 314.

In step S210, the settings registration unit 12 of the information processing system 10 stores the received information as transfer settings information 154 in the storage unit 15. In step S211, the settings registration unit 12 transmits data indicating the setting completion screen to the administrator terminal 5.

The operation of the image forming apparatus 20 for receiving the facsimile data is described with reference to the drawings.

Figure 14:
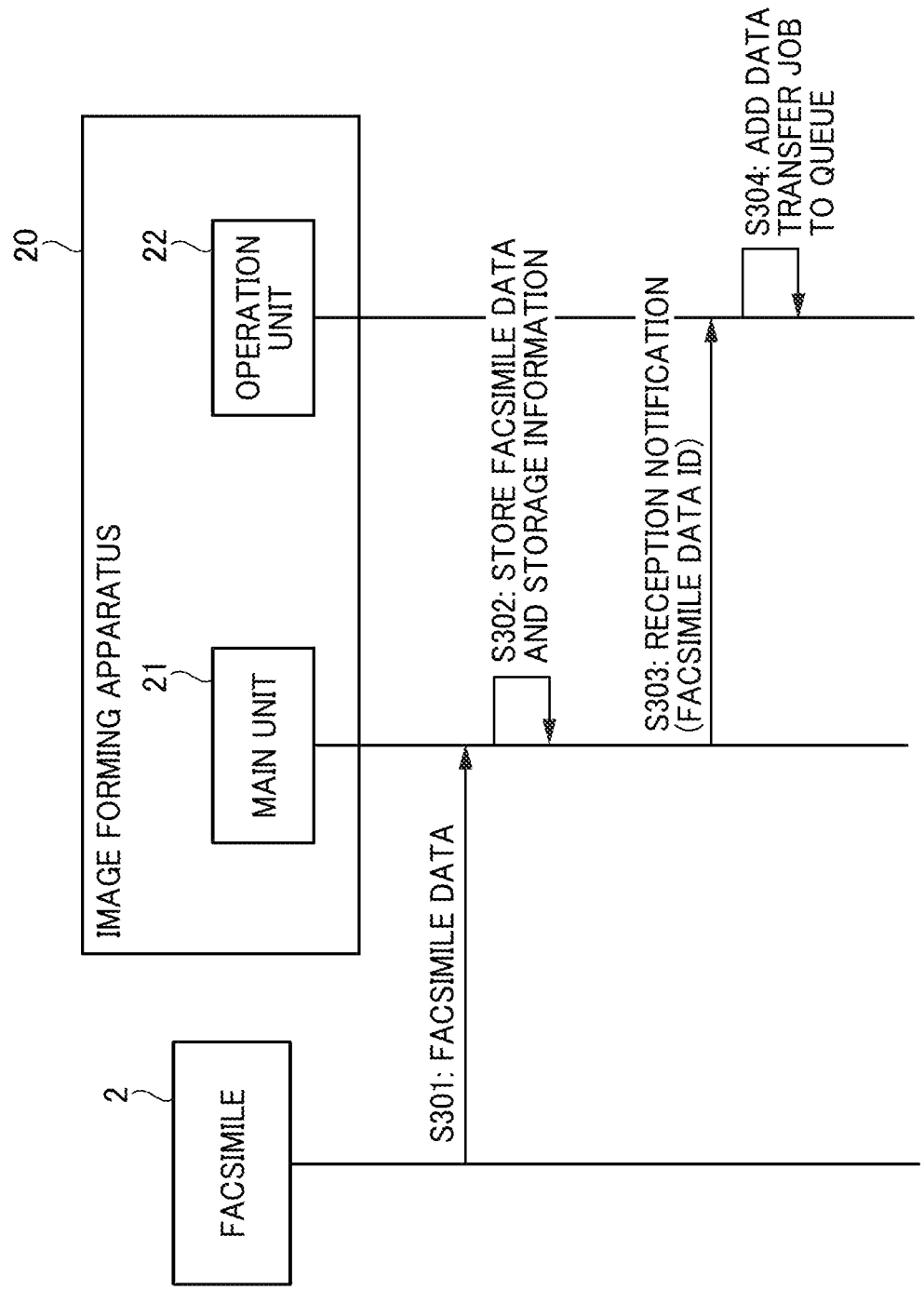
FIG. 14 is a sequence diagram illustrating an example of a data reception process.

FIG. 14 is a sequence diagram illustrating an example of a data reception process.

In response to an operation of transmitting the facsimile, the facsimile 2 transmits facsimile data to the image forming apparatus 20 in step S301. The facsimile data includes image data and metadata. The metadata indicates attributes of the image data and includes at least a fax number of transmission source.

In response to receiving the facsimile data through a fax line, the internet, or the like, the data reception unit 25 of the main unit 21 of the image forming apparatus 20 stores the facsimile data and the storage information in the storage unit 26 in step S302. Specifically, the data reception unit 25 converts the image data included in the received facsimile data into a general-purpose data format such as a Portable Document Format (PDF) and saves the converted image data as facsimile data.

In addition, the data reception unit 25 generates storage information based on the metadata included in the facsimile data.

Figure 15:
FIG. 15 is a diagram illustrating an example of storage information.

FIG. 15 is a diagram illustrating an example of the storage information.

The storage information 261 includes, as items, a "facsimile data ID", a "sender number", and "reception time".

The "facsimile data ID" identifies the received facsimile data. The data reception unit 25 assigns the facsimile data ID when inserting a record into the storage information 261.

The "sender number" is the fax number of the transmission source of the facsimile data. The data reception unit 25 extracts the fax number of the transmission source from the metadata and sets as the "sender number".

The "reception time" is the time when the facsimile data was received. The data reception unit 25 sets the time when the facsimile data and the storage information are stored in the "reception time".

Returning to FIG. 14, the data reception unit 25 transmits a signal (reception notification) notifying that the facsimile data has been received to the operation unit 22 in step S303. The reception notification includes the facsimile data ID.

In step S304, the transfer instruction unit 23 of the operation unit 22 adds the data transfer process to the queue. Specifically, the transfer instruction unit 23 adds a record indicating a process of transferring the received facsimile data to the end of waiting line of queue information stored in the RAM 223.

An operation of the data transfer system 1 for transferring facsimile data is described with reference to the drawings.

Figure 16:
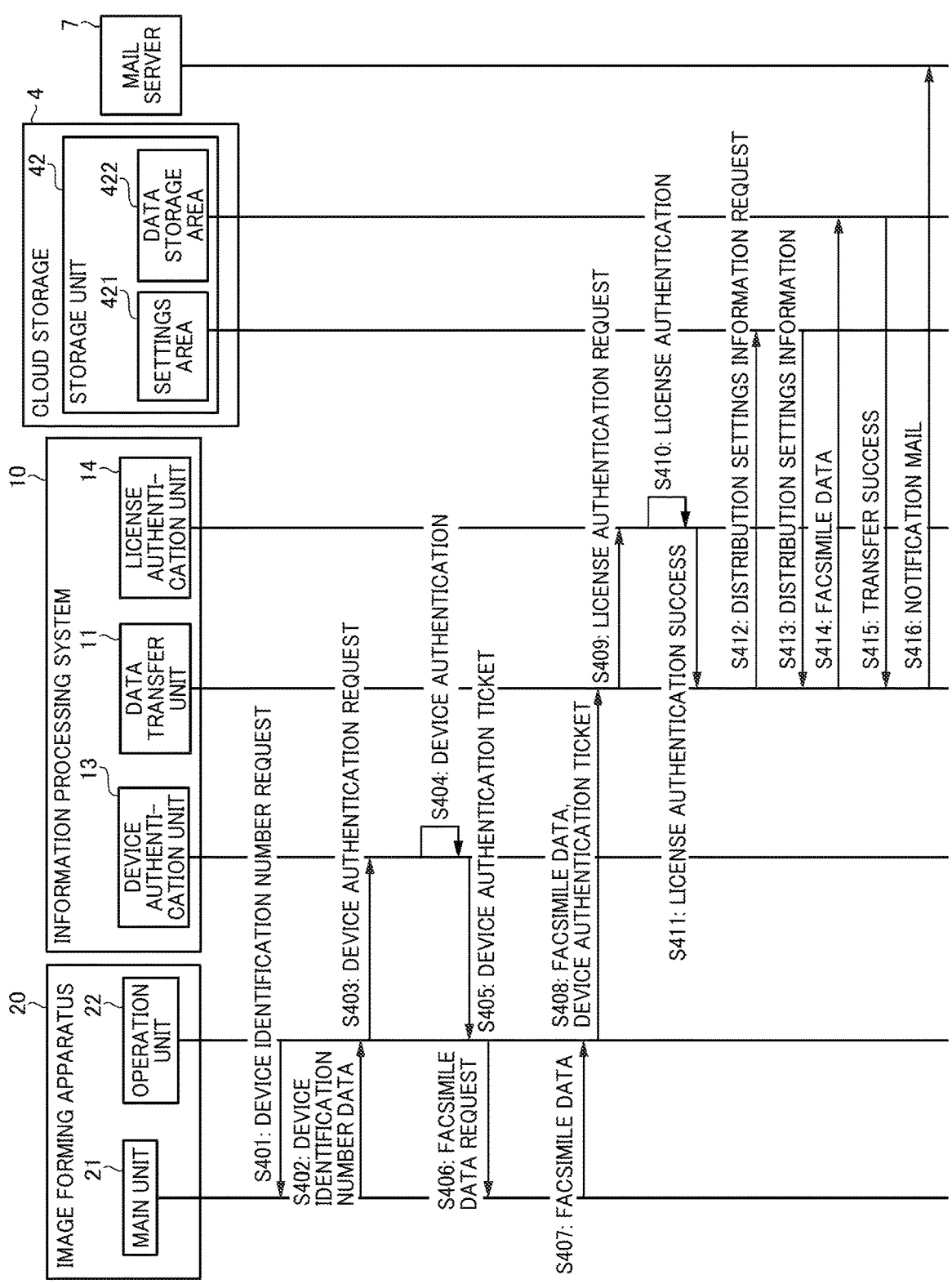
FIG. 16 is a sequence diagram illustrating an example of a data transfer process.

FIG. 16 is a sequence diagram illustrating an example of a data transfer process.

The transfer instruction unit 23 of the operation unit 22 starts the data transfer process when a preceding process in the queue is completed. In step S401, the transfer instruction unit 23 transmits a request for the device identification number to the main unit 21.

In step S402, the web API service unit 24 acquires the device identification number stored in the storage unit 26 and transmits the acquired device identification number to the operation unit 22.

In step S403, the transfer instruction unit 23 of the operation unit 22 transmits a device authentication request to the information processing system 10. The device authentication request includes the device identification number.

In step S404, the device authentication unit 13 of the information processing system 10 authenticates the device. Specifically, the device authentication unit 13 determines whether or not the device identification number is included in the device information 153. In step S405, when the device authentication unit 13 determines that the device identification number is included in the device information 153, the device authentication unit 13 transmits a device authentication ticket indicating that the device authentication is successful to the image forming apparatus 20.

In step S406, the transfer instruction unit 23 of the operation unit 22 transmits a request to transmit the facsimile data to the main unit 21. The request to transmit the facsimile data includes the facsimile data ID. In step S407, the main unit 21 acquires the facsimile data from the storage unit 26 based on the facsimile data ID included in the received request and transmits the acquired facsimile data to the operation unit 22.

In step S408, the transfer instruction unit 23 of the operation unit 22 transmits the facsimile data together with the device authentication ticket to the information processing system 10.

In response to receiving the facsimile data, which is the image data, the data transfer unit 11 stores transfer history information of the image data in the storage unit 15. The transfer history information indicates the transfer operation of image data, including the transfer status. Specifically, the data transfer unit 11 stores the transfer status included in the transfer history information as "accepted" which indicates that the transfer instruction has been received.

In step S409, the data transfer unit 11 transmits a license authentication request to the license authentication unit 14.

In step S410, the license authentication unit 14 executes license authentication. Specifically, the license authentication unit 14 identifies the device identification number based on the device authentication ticket and determines whether or not the device corresponding to the device identification number is assigned to the license of the tenant corresponding to the device identification number. As a result, the license authentication unit 14 determines whether or not the data transfer function is active.

Alternatively, the license authentication unit 14 may determine whether or not the corresponding license is within the valid period.

When the license authentication is successful, the license authentication unit 14 transmits a signal indicating that the license authentication is successful to the data transfer unit 11 in step S411.

In step S412, the data transfer unit 11 transmits a request to transmit the distribution settings information to the cloud storage 4. Specifically, the data transfer unit 11 includes the storage destination information of the distribution settings information included in the transfer settings information 154 and the storage account information in the request to transmit the distribution settings information.

The storage authentication unit 41 of the cloud storage 4 authenticates based on the received storage account information. Specifically, the storage authentication unit 41 determines whether or not to allow reading of data from the settings area 421. In step S413, when the storage authentication unit 41 determines that the reading is permitted, the cloud storage 4 transmits the distribution settings information stored in the settings area 421 to the information processing system 10. The data transfer unit 11 updates the transfer status included in the transfer history information stored in the storage unit 15 to "processing" which indicates that the transfer process is in progress.

In step S414, the data transfer unit 11 of the information processing system 10 transmits the facsimile data to the cloud storage 4. Specifically, the data transfer unit 11 distributes the facsimile data to each folder based on the received distribution settings information and transmits the facsimile data to the cloud storage 4 together with the information for designating the distributed folders.

The distribution settings information is an Excel file or the like including tabular data. When the data transfer unit 11 (web application) acquires the Excel file, the data transfer unit 11 converts the Excel format (table format) to the JavaScript Object Notation (JSON) format. Furthermore, using the fax number, folder name, and mail address included in the conversion result, the data transfer unit 11 transmits a PDF file of the facsimile data, stores the PDF file in a folder with a folder name corresponding to the sender number (fax number) of the received facsimile data, and sends a mail to the corresponding mail address. If the folder with the folder name corresponding to the sender number does not exist in the storage destination, the data transfer unit 11 causes the cloud storage 4 to create a folder with the corresponding folder name and store the PDF file of facsimile data in the created folder.

In the case of facsimile data received from a sender number not defined in the distribution settings information, the data transfer unit 11 designates the folder name included in the undefined data distribution information as the storage location.

Further, the data transfer unit 11 may transmit information for designating the file name after transfer together with the facsimile data. The file name includes, for example, name of the sender, date, and number. Further, the data transfer unit 11 may change the file name by using the name, date and number of the transmission source, and then transmit the file. The name of the sender is the same as the name of the folder of the distribution destination. Alternatively, name of the sender may be included in the metadata of the facsimile data. Further, when the facsimile data in which the sender number is not defined in the distribution settings information is transferred, the sender number may be used instead of the sender name.

The storage authentication unit 41 of the cloud storage 4 authenticates based on the received storage account information. Specifically, the storage authentication unit 41 determines whether or not to allow writing of data to the data storage area 422. Then, when the storage authentication unit 41 determines that writing is permitted, the cloud storage 4 stores the received facsimile data in the designated folder of the data storage area 422.

In step S415, the cloud storage 4 transmits a signal indicating that the data transfer is successful to the information processing system 10. The data transfer unit 11 updates the transfer status included in the transfer history information stored in the storage unit 15 to "completed", which indicates the completion of transfer.

In step S416, the data transfer unit 11 sends a notification mail indicating the completion of the transfer and the distribution destination of the facsimile data to the mail server 7. Specifically, the data transfer unit 11 transmits a notification mail addressed to the "notification destination mail address" of the distribution settings information. The mail server 7 sends the received notification mail to the designated destination.

If an error occurs in any of the above processes, the data transfer unit 11 sends a notification mail indicating the occurrence of the error to the mail address included in the error notification destination information.

FIG. 17 is a diagram illustrating an example of the notification mail.

The notification mail 701 is an example of the notification mail when the facsimile data in which the sender number is defined in the distribution settings information is transferred. For example, when the facsimile data is distributed to a folder called "ABC", a path name and a file name including "ABC" are included in a body of the notification mail.

FIG. 18 is a diagram illustrating another example of the notification mail.

The notification mail 702 is an example of the notification mail when the facsimile data in which the sender number is not defined in the distribution settings information is transferred. For example, when the facsimile data is distributed to a folder called "undefined", a path name and a file name including "undefined" are included in a body of the notification mail. The destination of the notification mail 702 is a mail address included in the undefined data distribution information.

According to the data transfer system 1 of the present embodiment, the tenant administrator sets the distribution destination for the transfer of facsimile data by storing the distribution settings information in the cloud storage 4. As a result, the distribution destination can be flexibly changed without changing the settings of the image forming apparatus 20 and the information processing system 10. In addition, the distribution destination can be easily changed at any time from a terminal such as the administrator terminal.

Further, when executing data transfer by the web application of the information processing system 10, by using the device identification number sent from the device to check whether a valid device license corresponding to the web application is assigned to the device, management of the availability of web applications for each device for each tenant and implementation of subscriptions for device applications become possible. Further, when managing the validity of the device application installed on the device based on the license information on the information processing system 10, communication between the information processing system 10 and the device only for confirming the license is unnecessary.

Hereinafter, a description is given of a second embodiment of the present disclosure, with reference to drawings. The second embodiment is different from the first embodiment in that the distribution settings information is input to the settings registration unit 12 of the information processing system 10. The description of the second embodiment is given of the differences from the first embodiment. The same reference numerals are given to the same or corresponding functions or configurations as those of the first embodiment, and redundant descriptions thereof are omitted appropriately.

Figure 19B:
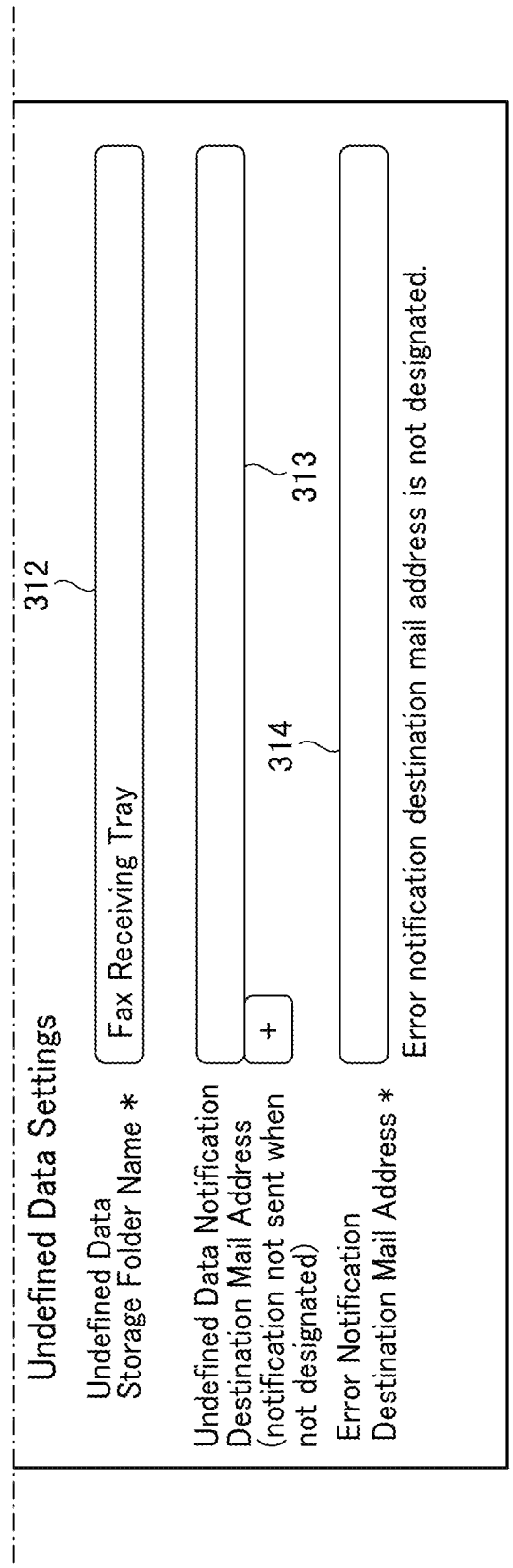

FIGS. 19A and 19B are diagrams illustrating an example of a data transfer function setting screen according to the second embodiment.

The data transfer function setting screen 315 according to the present embodiment is a screen displayed by the settings registration unit 12 on the web browser of the administrator terminal 5 and includes a distribution settings information input field 316.

The distribution settings information input field 316 is a GUI to input the value of each item of the distribution settings information. The input distribution settings information is stored in the storage unit 15 of the information processing system 10 as a part of the transfer settings information 154.

In the data transfer function setting process according to the present embodiment, the processes of steps S201 and S202 of FIG. 10 are unnecessary. Further, in step S209, the distribution settings information is transmitted instead of the storage destination information of the distribution settings information.

In the data transfer process according to the present embodiment, the processes of steps S412 and S413 of FIG. 16 are unnecessary. In the process of step S414, the data transfer unit 11 distributes and transfers the facsimile data based on the distribution settings information included in the transfer settings information 154.

According to the data transfer system 1 of the present embodiment, since it is not necessary to store the distribution settings information in the cloud storage 4, for example, a burden of the setting work when there are few distribution destinations is reduced.

The distribution settings information described in each embodiment may be linked with an address book stored in the image forming apparatus 20. For example, the "fax number" and the "contact name" included in the address book are assigned to the "sender number" and the "distribution destination folder name" of the distribution settings information.

For example, in the data transfer function activation process, the settings registration unit 12 of the information processing system 10 receives the address book data stored in the image forming apparatus 20 and may include the distribution settings information based on the received address book data in the transfer settings information 154. For example, between S111 and S112, the image forming apparatus 20 may transmit the address book data to the information processing system 10, and the information processing system 10 may additionally execute a process of including the distribution settings information in the transfer settings information 154.

Alternatively, in the data transfer process, the transfer instruction unit 23 of the information processing system 10 may transmit information indicating the "contact name" included in the address book together with the facsimile data to the information processing system 10.

Instead of receiving the input of the storage destination information of the cloud storage 4 on the data transfer function setting screen, the settings registration unit 12 of the information processing system 10 may accept the designation of the device identification number and the device name of one or more image forming apparatuses 20 by the tenant administrator and may receive the address book data of the image forming apparatus 20.

In various processes for transmitting the device identification number, the information processing system 10 may receive an authentication ticket associated with the device identification number and transmit the received authentication ticket instead of the device identification number.

In each of the above-described embodiments, examples are described in which one account of the cloud storage 4 is used and data is distributed and stored in the area allocated to the account. Alternatively, different storage accounts may be used for each distribution destination.

In the above described case, instead of registering the storage account information from the data transfer function setting screen, the storage account information may be included in the distribution settings information. Specifically, the distribution settings information includes the account ID and password for each distribution destination, and the data transfer unit 11 transmits the account ID and password of the distribution destination to the cloud storage 4 together with the facsimile data.

In this way, the transferred facsimile data cannot be viewed without the storage account information for each user, which is highly secure.

In each of the above-described embodiments, examples of transferring facsimile data have been described, but the present disclosure is not limited to these examples, and the present disclosure is applicable to systems for transferring various types of data such as mails and files.

The apparatuses or devices described in each embodiment are merely one example of plural computing environments that implement one or more embodiments disclosed herein. In some embodiments, information processing system 10 includes multiple computing devices, such as a server cluster. The plurality of computing devices are configured to communicate with one another through any type of communication link, including a network, shared memory, etc., and perform the processes disclosed herein. Similarly, image forming apparatus 20 may include multiple computing devices configured to communicate with one another.

Further, the information processing system 10 and the image forming apparatus 20 are configured to share the disclosed processing steps, for example, the processing steps of the sequence disclosed in FIG. 5, 10, 14 or 16 in various combinations. The elements of the information processing system 10 and the image forming apparatus 20 may be combined into one server or may be divided into a plurality of apparatuses.

Each function of the embodiments described above can be implemented by one or a plurality of processing circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Further, in each of the above-described embodiments, the image forming apparatus 20 is described as an example of a device for receiving data. Alternatively, the device is not limited to the image forming device as long as the device has a communication function. The device includes, for example, projectors (PJ), output devices such as digital signage, head up display (HUD) devices, industrial machines, medical devices, network home appliances, connected cars, notebook personal computers (PCs), mobile phones, tablet terminals, game machines, personal digital assistants (PDAs), digital cameras, wearable PCs, desktop PCs, and the like.

Further, the application program mounted on the image forming apparatus 20 may be mounted on an information processing device such as a user's PC, a mobile terminal, or a smartphone. Accordingly, the above-mentioned operation unit 22 may be provided by a device other than the image forming apparatus 20.

The cloud storage 4 is an example of storage for storing data. The storage does not have to be cloud storage and may be a single device or may include a plurality of devices.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. An information processing system comprising:
circuitry configured to
determine whether a data transfer function of a device is active, and
transfer data to storage that is a transfer destination, wherein
the data transfer function of the device is
determined as active in a case where flag information stored in a device memory of the device indicates that the data transfer function is active, and
determined as inactive in a case where in a case where the flag information indicates that the data transfer function is not active,
the circuitry performs an authentication process to authenticate the device in a case where the data transfer function of the device is determined as inactive, the authentication process including
transmitting a request for a list of licenses for the data transfer function, the request for the list of licenses including a device identification number,
receiving a list of licenses transmitted in response to the request for the list of licenses, and
determining whether the device has a license for the data transfer function,
the device transmits a data transfer request in a case where the device has the license for the data transfer function, and
the circuitry is configured to transfer the data with reference to distribution settings information that designates a storage location of the data in the storage in response to the data transfer request.

2. The information processing system of claim 1, wherein the circuitry is further configured to:
receive registration of transfer settings information that is related to the distribution settings information;
acquire storage destination information that indicates the storage location of the distribution settings information in the storage as the transfer settings information; and
acquire the distribution settings information from the storage based on the storage destination information.

3. The information processing system of claim 2, further comprising:
one or more memories, wherein the circuitry is further configured to:
store the distribution settings information in the memories; and
acquire the distribution settings information from the memories.

4. The information processing system of claim 2, wherein the circuitry is further configured to:
acquire the distribution settings information from a device that transmits the data.

5. The information processing system of claim 2, wherein the circuitry is further configured to:
acquire storage account information indicating a storage account; and
transmit the storage account information to the storage.

6. The information processing system of claim 1, wherein the data includes information that identifies a transmission source; and
the distribution settings information includes information on a distribution destination for each transmission source.

7. The information processing system of claim 1, wherein the device is an image forming apparatus, and
the data includes an image transmitted from a facsimile to the image forming apparatus.

8. The information processing system according to claim 1, wherein the information processing system is implemented by one or more information processing apparatuses.

9. A data transfer method comprising:
determining whether a data transfer function of a device is active, wherein
the data transfer function of the device is
determined as active in a case where flag information stored in a device memory of the device indicates that the data transfer function is active, and
determined as inactive in a case where the flag information indicates that the data transfer function is not active,
the circuitry performs an authentication process to authenticate the device in a case where the data transfer function of the device is determined as inactive, the authentication process including
transmitting a request for a list of licenses for the data transfer function, the request for the list of licenses including a device identification number,
receiving a list of licenses transmitted in response to the request for the list of licenses, and
determining whether the device has a license for the data transfer function,
transmitting a data transfer request from the device in a case where the device has the license for the data transfer function, and
transferring data to storage that is a transfer destination of the data with reference to distribution settings information that designates a storage location of the data in response to the data transfer request.

10. A non-transitory recording medium storing a computer readable code for controlling a computer system to carry out a data transfer method comprising:
determining whether a data transfer function of a device is active, wherein
the data transfer function of the device is
determined as active in a case where flag information stored in a device memory of the device indicates that the data transfer function is active, and
determined as inactive in a case where the flag information indicates that the data transfer function is not active,
the circuitry performs an authentication process to authenticate the device in a case where the data transfer function of the device is determined as inactive, the authentication process including
transmitting a request for a list of licenses for the data transfer function, the request for the list of licenses including a device identification number,
receiving a list of licenses transmitted in response to the request for the list of licenses, and
determining whether the device has a license for the data transfer function, and
transmitting a data transfer request from the device in a case where the device has the license for the data transfer function, and
transferring data to storage that is a transfer destination of the data with reference to distribution settings information that designates a storage location of the data in response to the data transfer request.

* * * * *